United States Patent [19]

Bechen et al.

[11] Patent Number: 4,656,085
[45] Date of Patent: Apr. 7, 1987

[54] IMPREGNATED SOFT, FLAT GASKET AND MANUFACTURING METHOD

[75] Inventors: Heribert Bechen, Cologne; Franz-Josef Giesen, Odenthal; Klaus Lönne; Klaus-Peter Majewski, both of Burscheid, all of Fed. Rep. of Germany

[73] Assignee: Goetze AG, Burscheid, Fed. Rep. of Germany

[21] Appl. No.: 768,851

[22] Filed: Aug. 23, 1985

[30] Foreign Application Priority Data

Aug. 29, 1984 [DE] Fed. Rep. of Germany ....... 3431633

[51] Int. Cl.$^4$ .................. B32B 27/00; F16J 15/12
[52] U.S. Cl. .................. 428/290; 277/227; 277/235 B; 427/180; 427/220; 427/297; 427/372.2; 427/430.1; 428/64; 428/413; 428/524
[58] Field of Search ............ 428/64, 65, 524, 290, 428/413; 277/235 B, 1, 227, 235 A; 427/180, 220, 297, 372.2, 430.1

[56] References Cited

U.S. PATENT DOCUMENTS

| | | | |
|---|---|---|---|
| 3,970,322 | 7/1976 | Stecher et al. | 277/235 B |
| 4,201,804 | 5/1980 | Stecher et al. | 277/235 B |
| 4,223,897 | 9/1980 | Staab et al. | 277/235 B |
| 4,330,442 | 5/1982 | Lindeman et al. | 524/16 |
| 4,355,068 | 10/1982 | Beyer et al. | 277/235 B |
| 4,483,539 | 11/1984 | Bindel et al. | 277/1 |

FOREIGN PATENT DOCUMENTS 2637249  7/1982  Fed. Rep. of Germany.
2499463  8/1982  France.

*Primary Examiner*—Paul J. Thibodeau
*Attorney, Agent, or Firm*—Spencer & Frank

[57] ABSTRACT

An impregnated soft, flat sealing gasket made by a process including the consecutive steps of preparing a gasket material selected from the group consisting of organic fibers, inorganic fibers, synthetic fibers and mixtures thereof and a binder; forming a fiber mat from the gasket material; impregnating the fiber mat with a crosslinkable impregnating agent and at least partly crosslinking the impregnating agent in the fiber mat; and adding to the fiber material, in a fine distribution therein, a duromer synthetic resin prior to the impregnating step and as early as simultaneously with the preparing step.

17 Claims, 1 Drawing Figure

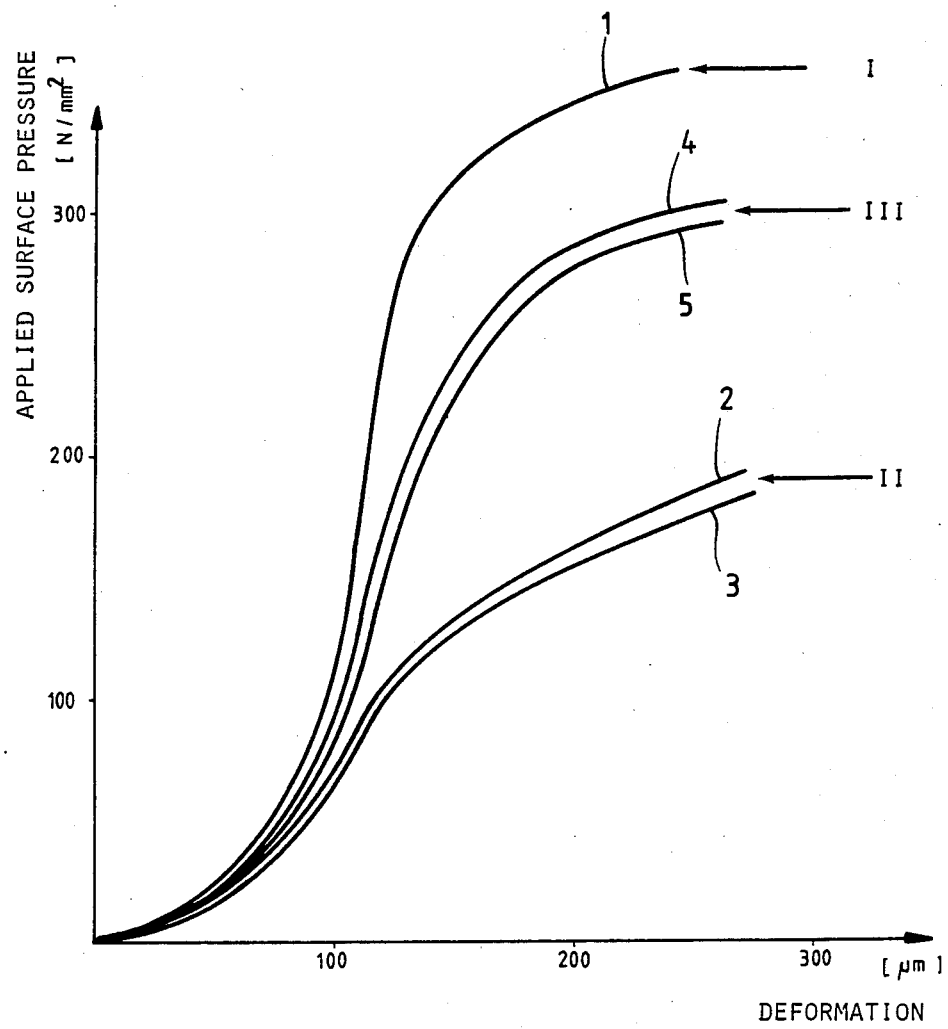

IMPREGNATED SOFT, FLAT GASKET AND MANUFACTURING METHOD

BACKGROUND OF THE INVENTION

1. Field of the Invention

The present invention relates to an impregnated soft, flat gasket, particularly for use as a cylinder head gasket in internal combustion engines, and a manufacturing method therefor.

2. Discussion of the Prior Art

Soft gaskets suitable for use as cylinder head gaskets for internal combustion engines are generally composed of nonwoven fiber mats comprised of organic fibers, inorganic fibers, synthetic fibers, natural fibers or mixtures thereof, and binders, preferably elastomeric binders, such as rubber. The nonwoven fiber mats may be reinforced with one or more metal inserts imbedded in the interior, and the nonwoven fiber mats may additionally include a filler having a fine grain size. In order to increase the cross-sectional density and strength of such gaskets, U.S. Pat. No. 4,201,804 to Stecher et al—the contents of which are hereby incorporated by reference—discloses an impregnation of the nonwoven fiber mat with impregnating agents, which are cross-linkable liquids. Subsequently, the impregnating agent is partially or fully cross-linked, preferably in a thermal process.

The deformation behavior of impregnated gaskets in response to applied surface pressures is influenced by the impregnating agent. Compared to a non-impregnated fiber mat gasket, the impregnated fiber mat gasket begins to flow under lower applied surface pressures and, thus, is usable only for applications in which it is subjected to such lower surface pressure stresses. This is because the yield points of impregnated fiber mat gaskets are lower than the yield points of non-impregnated fiber mat gaskets. This low yield point is a drawback, particularly in a gasket which has openings framed by casings, because in the zones of encased gasket openings particularly high sealing pressures should prevail in the installed state for obtaining the highest possible sealing quality. Therefore, according to U.S. Pat. No. 3,970,322 to Stecher et al, gasket zones underneath the encased edges of gasket openings are sought to be kept free of impregnating agent. For this purpose, the gaskets are first encased and subsequently impregnated, preferably by immersion in a bath of impregnating agent. However, the casings, which have an approximately U-shaped cross section and are bent around the edges of the soft material, may spring open after mounting on the gasket and create a gap between the soft material and the outer circumferential edges of the casings. Thus, the impregnating agent may flow into the soft material underneath the casing during the immersion process. The gaskets may then have a disadvantageously low yield point underneath the encased edges. Further, for some applications, it is necessary for the gasket to have a high yield point over the entire impregnated surface.

It is further known to add anti-aging materials to the fiber mat to protect impregnated gaskets against aging which results from the impegnating agent becoming hard and brittle, particularly after longer periods of storage. Thus, as disclosed in German Patent No. 2,637,249, it has been found particularly advantageous to add to the fiber mat small amounts of phenol resins, such as, from 0.2 to 2 weight %, to retard aging. However, no increase in the yield point for the impregnated gasket was obtained.

SUMMARY OF THE INVENTION

The purpose of the present invention is to provide an improved impregnated soft, flat gasket of the above-outlined type, suitable for use as a cylinder head gasket, wherein the yield point of the finished gasket is significantly increased in all surface regions, and which is simple and inexpensive to manufacture.

To accomplish this purpose, the gasket according to the invention includes at least one duromer synthetic resin in the nonwoven fiber mat in a finely distributed form, introduced into the mat before impregnation thereof by the impregnating agent.

Preferably, the content of the duromer synthetic resins lies between 3 and 15 weight % with respect to the weight of the impregnated fiber mat, and the duromer synthetic resins may be epoxy resins, melamine resins, and/or phenol resins.

BRIEF DESCRIPTION OF THE DRAWING

The invention includes a method of making an impregnated soft, flat sealing gasket including the consecutive steps of preparing a gasket material selected from the group consisting of organic fibers, inorganic fibers, synthetic fibers and mixtures thereof and a binder, forming a fiber mat from the gasket material, impregnating the fiber mat with a cross-linkable impregnating agent and at least partly cross-linking the impregnating agent in the fiber mat; in which the improvement includes the step of adding to the fiber material, in a fine distribution therein, a duromer synthetic resin prior to the impregnating step and as early as simultaneously with the preparing step.

The sole FIGURE illustrates a graph showing the deformation behavior of gaskets in response to applied surface pressures.

DETAILED DESCRIPTION OF THE INVENTION

In making the impregnated fiber mats according to the invention, it is essential that the duromer synthetic resins be present—preferably in a still reactive form, that is, either in an uncross-linked state or a partly cross-linked state,—in the fiber mat before the impregnation with the liquid agent takes place. The duromer synthetic resin or resins are in a partly cross-linked state within the finished mat which is ready to be installed for operation.

According to a preferred manufacturing process of the invention which generally follows the principle of known paper making processes, the synthetic resins are added in a powdered or fine-grained form, preferably in a still reactive, partly cross-linked state, to the fiber slurry containing a binder additive. After the screening of the slurry the synthetic resin particles are present in a finely dispersed form on the fibers retained by the screen. If final cross-linking of the synthetic resins is required, such may be effected either before the liquid impregnation or thereafter, simultaneously with the cross-linking of the impregnating agent. It is within the scope of the invention to add the fully or partly cross-linked duromer synthetic resins to the fiber slurry in a dissolved, suspended or dispersed state.

According to another alternative, the nonwoven fiber mats may be produced by rolling fiber substances, especially plastic fibers and binders, and the duromer synthetic resins may be mixed into these mixtures to be rolled. If a final (full) cross-linking of the duromer synthetic resins is desired, this may be accomplished after preparation of the fiber mats and before the impregnation step, or after the impregnation step during the cross-linking of the impregnating agent.

According to still another alternative, a nonwoven fiber mat may be prepared without the duromer synthetic resins and may be instead pre-impregnated with the duromer synthetic resins, before impregnation with an impregnating agent. The pre-impregnation of the fiber mat may be accomplished by immersing the mat in a solution, dispersion, or suspension of the duromer synthetic resins, which may be in a partly or fully cross-linked form.

When the deformation behavior of the finished gaskets was tested, their yield points were determined to be higher than the yield points of conventionally impregnated gaskets which did not contain duromer synthetic resins. The duromer synthetic resins, when precipitated or otherwise deposited on the fibers so as to be uniformly distributed, appear to form a stable framework with the fibers particularly during the final cross-linking step, which is not destroyed by the subsequent liquid impregnation step. Such a stable framework of fibers and duromer synthetic resins is able to withstand greater pressure stresses and thus has a higher yield point.

Consequently, the gaskets according to the present invention have a higher yield point over the entire surface, in the gasket zones underneath the casings which surround gasket openings, as well as in all the other gasket areas. At the same time, however, the gaskets according to the invention also demonstrate the known improved characteristics obtainable by liquid impregnation, particularly with respect to cross-sectional density and tensile strength.

The present invention thus provides an impregnated soft, flat gasket which can be stressed with high sealing pressures. In gasket embodiments having encased edges, particularly in the region underneath the casing along the opening edges, the gaskets may be stressed with high sealing pressures, even if there has been an undesirable influx of impregnating agents underneath the casings. Further, the duromer-containing nonwoven flat mats according to the present invention may be impregnated by immersing them in the liquid impregnating agent before the opening edges are encased. It has been found that gaskets produced in this manner still provide a good seal even at their opening edges. The gaskets according to the invention can also be used for special applications, for example, as a cylinder head gasket in heavy duty diesel engines, due to the high yield point of the soft gasket material in surface regions in addition to the encased edge zones.

Turning now to the Figure, there is shown therein the deformation behavior of three gaskets in response to applied surface pressures. The gaskets were of the encased type and measurements were made in the encased region and in the remaining surface region.

Gasket I is a conventional, non-impregnated cylinder head gasket made of a conventional asbestos fiber mat with metal reinforcement. Curve 1 illustrates its deformation behavior both at the casing regions and in the remaining surface region.

Gasket II differs from gasket I in that it has been impregnated as disclosed in U.S. Pat. No. 3,970,322. Curves 2 and 3 show the deformation behavior of the gasket under applied surface pressure at the casing region and in the remaining surface region, respectively.

Gasket III differs from gasket II in that it additionally contains, according to the invention, 11 weight % of an epoxy resin, based on the weight of the impregnated fiber mat, which had been introduced into the nonwoven fiber mat before the liquid impregnation step, and subsequently partly cross-linked. Curves 4 and 5 show the deformation behavior of this gasket, according to the present invention, under surface pressures measured in the casing region and in the remaining surface region, respectively.

The slope of curve 1, illustrating the deformation behavior of the non-impregnated flat gasket I, does not begin to drop significantly until a surface pressure of more than 300 N/mm$^2$ is reached. The deformation behavior of impregnated flat gasket II (curves 2 and 3) exhibits the most unfavorable deformation behavior, while flat gasket III, according to the present invention (curves 4 and 5) exhibits deformation behavior whose greatest drop lies only slightly below 300 N/mm$^2$. The gasket III thus exhibits only a slightly reduced deformation characteristic compared to the non-impregnated flat gasket I, but exhibits an unexpectedly superior deformation characteristic compared to the impregnated flat gasket II.

It will be understood that the above description of the present invention is susceptible to various modifications, changes and adaptations, and the same are intended to be comprehended within the meaning and range of equivalents of the appended claims.

What is claimed is:

1. In an impregnated, soft, flat sealing gasket, including a fiber mat formed of a material selected from the group consisting of organic fibers, inorganic fibers, synthetic fibers and mixtures thereof, and a binder; said gasket further including an at least partly cross-linked impregnating agent, the improvement wherein said fiber mat contains from 3 to 15% by weight relative to the impregnated fiber mat of a duromer synthetic resin uniformly distributed therein, whereby said gasket has a higher yield point under applied surface pressure than that for a corresponding but duromer synthetic resin-free gasket.

2. A sealing gasket as defined in claim 1, wherein said duromer synthetic resin is selected from the group consisting of expoxy resins, melamine resins, phenol resins and mixtures thereof.

3. In an impregnated, soft, flat sealing gasket made by a process including the consecutive steps of preparing a gasket material selected from the group consisting or organic fibers, inorganic fibers, synthetic fibers and mixtures thereof and a binder, forming a fiber mat from the gasket material, impregnating the fiber mat with a cross-linkable impregnating agent and at least partly cross-linking the impregnating agent in the fiber mat; the improvement comprising the step of adding to the fiber gasket material and uniformly distributing therein a duromer synthetic resin prior to said impregnating step and as early as simultaneously with said preparing step, said resin being added in an amount ranging from 3 to 15% by weight relative to the impregnated fiber mat, whereby said gasket has a higher yield point under applied surface pressure than for a corresponding but duromer synthetic resin-free gasket.

4. A sealing gasket as defined in claim 3, wherein said duromer synthetic resin is selected from the group consisting of epoxy resins, melamine resins, phenol resins and mixtures thereof.

5. In a method of making an impregnated, soft, flat sealing gasket including the consecutive steps of preparing a gasket material selected from the group consisting of organic fibers, inorganic fibers, synthetic fibers and mixtures thereof and a binder, forming a fiber mat from the gasket material, impregnating the fiber mat with a cross-linkable impregnating agent and at least partly cross-linking the impregnating agent in the fiber mat; the improvement comprising the step of adding to the fiber gasket material and uniformly distributing therein from 3 to 15% by weight relative to the impregnated fiber mat of a duromer synthetic resin prior to said impregnating step and as early as simultaneously with said preparing step, whereby said gasket has a higher yield point under applied surface pressure than for a corresponding but duromer synthetic resin-free gasket.

6. A method as defined in claim 5, wherein the step of forming the fiber mat comprises the step of rolling the gasket material to obtain said mat; said adding step comprises adding the duromer synthetic resin to the gasket material prior to the rolling step.

7. A method as defined in claim 5, wherein said adding step comprises the step of pre-impregnating said fiber mat with a liquid containing said duromer synthetic resin.

8. A method as defined in claim 5, wherein said duromer synthetic resin is selected from the group consisting of epoxy resins, melamine resins, phenol resins and mixtures thereof.

9. A method as defined in claim 5, wherein the duromer synthetic resin is added in a fully cross-linked state.

10. A method as defined in claim 5, wherein the duromer synthetic resin is added in a partly cross-linked, reactive state.

11. A method as defined in claim 10, further comprising the step of completing the cross-linking of the duromer synthetic resin prior to said impregnating step.

12. A method as defined in claim 10, further comprising the step of completing the cross-linking of said duromer synthetic resin simultaneously with said step of at least partly cross-linking said impregnating agent.

13. A method as defined in claim 5, wherein said step of forming said mat comprises the steps of making a fiber slurry and screening the slurry for obtaining a fiber mat therefrom; said adding step comprises the step of adding the duromer synthetic resin to said slurry prior to said screening step.

14. A method as defined in claim 13, wherein the duromer synthetic resin is in a dissolved state when added to said slurry.

15. A method as defined in claim 13, wherein the duromer synthetic resin is in a powdery to fine-grained state when added to the slurry.

16. A method as defined in claim 15, wherein the duromer synthetic resin is in a solid state when added to said slurry.

17. A method as defined in claim 15, wherein the duromer synthetic resin is in a suspended state when added to said slurry.

* * * * *